United States Patent [19]

Dieckmann et al.

[11] Patent Number: 5,277,800

[45] Date of Patent: Jan. 11, 1994

[54] INNER FILTER FOR AQUARIUM

[75] Inventors: Klaus Dieckmann, Kuchen; Ulrich Herold, Weinheim; Ferdinand Mayer, Schwäbisch Gmünd; Walter Wiedenmann, Deizisau, all of Fed. Rep. of Germany

[73] Assignee: Eheim GmbH & Co. KG., Deizisau, Fed. Rep. of Germany

[21] Appl. No.: 997,239

[22] Filed: Dec. 28, 1992

[30] Foreign Application Priority Data

Feb. 29, 1992 [DE] Fed. Rep. of Germany ....... 4206425

[51] Int. Cl.$^5$ ............................................. A01K 63/04
[52] U.S. Cl. .................. 210/169; 210/416.2; 119/259
[58] Field of Search .................. 210/169, 416.2; 119/5

[56] References Cited

U.S. PATENT DOCUMENTS 4,512,724 4/1985 Horvath ............................... 210/169
4,589,982 5/1986 Willinger ............................. 210/169

Primary Examiner—Stanley S. Silverman
Assistant Examiner—Robert James Popovics
Attorney, Agent, or Firm—Michael J. Striker

[57] ABSTRACT

An inner filter for an aquarium has means forming a pump chamber, a filter chamber, a suction opening, and outlet opening, a suction passage which communicates with the pump chamber and the filter chamber and in which water is aspirated through the suction opening, a pressure chamber which communicates with the pump chamber and the outlet opening, a pump wheel, an electric motor having a rotor which drives the pump wheel in the pump chamber and also having a stator and a housing having three releasable and again assembleable segments, the segments including a first segment which accommodates the stator with an electric conductor, a second segment which accommodates the rotor with a bearing axles and bearings and also accommodates the pump wheel, the pump chamber, the filter chamber, the suction passage and the pressure passage, and a third segment which is placeable on the second segment and formed as a cover and has the outlet opening connectable with the pressure passage, the suction opening which is connectable with the filter chamber being provided in the region of one of the third segment and the first segment.

59 Claims, 4 Drawing Sheets

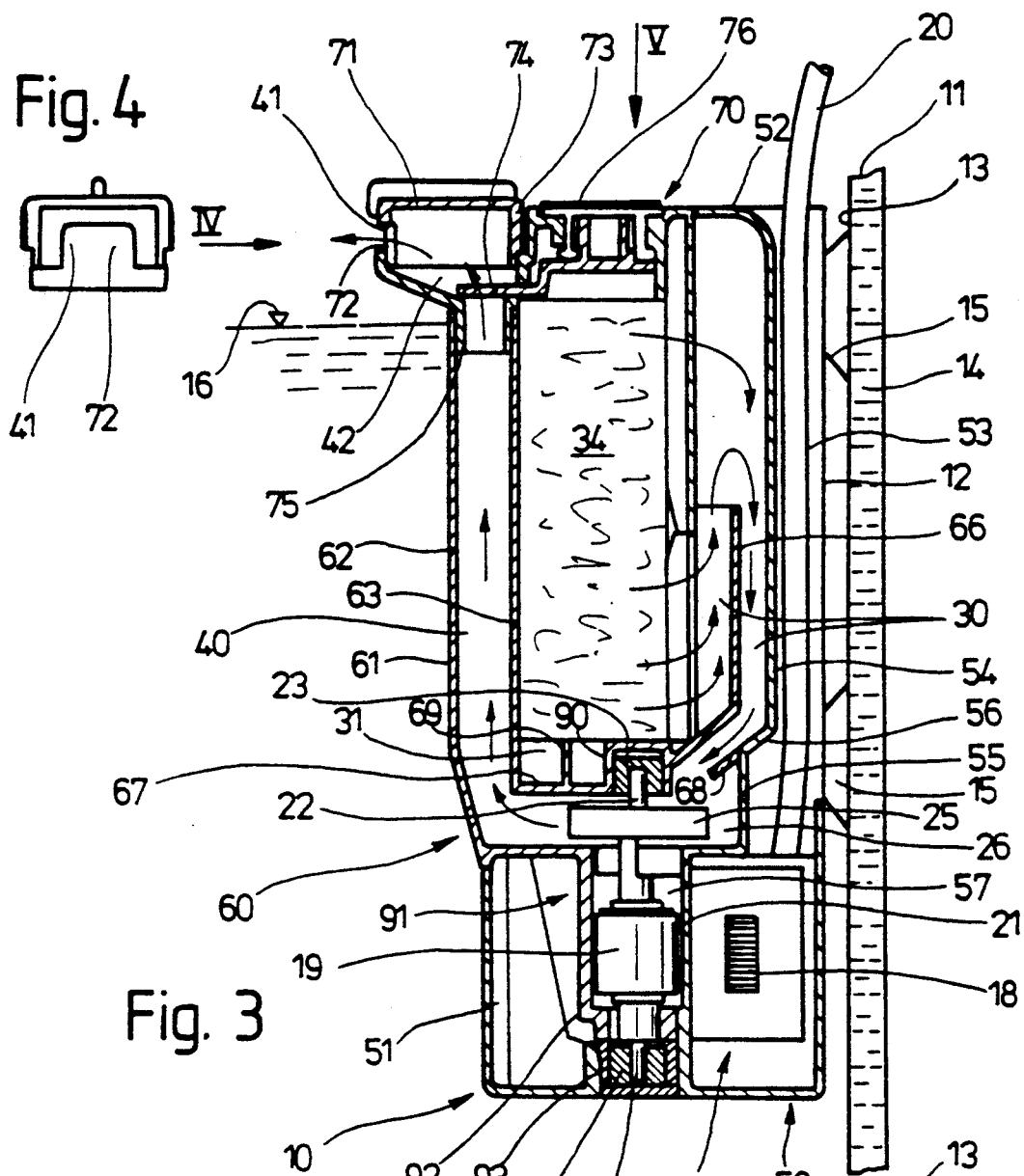
Fig. 4
Fig. 3
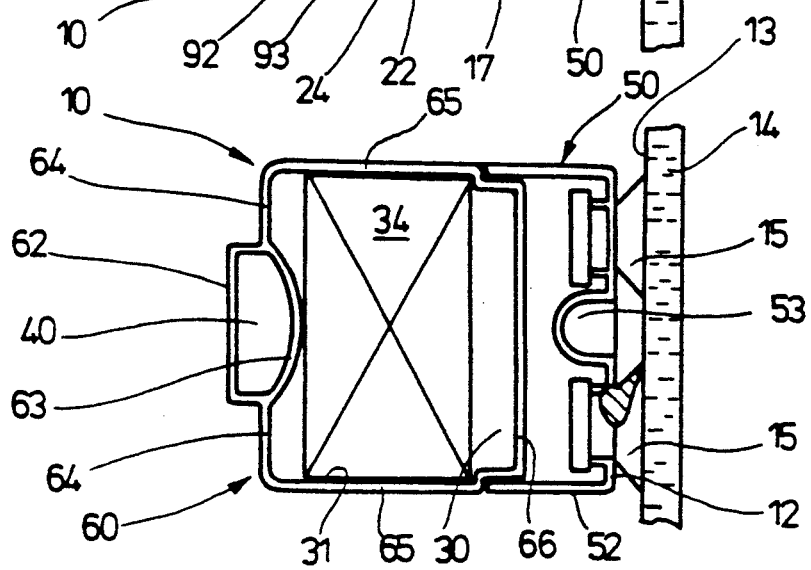
Fig. 5

INNER FILTER FOR AQUARIUM

BACKGROUND OF THE INVENTION

The present invention relates to inner filters for an aquarium with an electric motor operating to circulate water in the aquarium.

An inner filter of this type is disclosed for example in the German document DE-GM 81 26 762.2. It is substantially rod-shaped and has an upper pump head which is closed with a cover and accommodates the complete electric motor with a stator and a rotor as well as their bearing axles and bearings for a pump wheel rotated by the rotor. The pump head is also provided with a pump chamber and a pressure passage. The electric motor with its components is fixedly installed in the pump head. The pump chamber and the pump wheel arranged in it are located under the stator and the rotor. A housing part is arranged under the pump head and has a central suction passage which is coaxial to the rotor and can be defined for example by a pipe provided with openings. At least one filter insert is mounted on the pipe. The housing part which contains the filter insert is provided with openings in its wall for suction of water so that the water can be sucked through the filter insert into the central pipe which forms the suction passage. From there the water is supplied by the pump through the pump chamber into the pump head and from the pump head in the pressure passage located in it. Through the pressure passage the water is guided upwardly until it exits from an upwardly located outlet opening from the pump head. In this inner filter the lower end of the bearing axle is held in a special bottom part which is placed from below and releasably on the pump head and which is located between the pump head and the housing part located under it and containing the filter insert. When it is necessary to clean this known inner filter, it must be removed from the aquarium tank as a whole and then dismounted. For exchanging the filter insert the lower tubular housing part can be withdrawn. When, however, for example the pump wheel, the neighboring region of the rotor, the region of the pump chamber or the pressure passage must be cleaned, then first the bottom-side closure of the pump head must be released and removed. Then the rotor with the bearing axle and the bearings must be disassembled in its individual components so that an assembly problem takes place. Moreover, the individual regions even with the removed rotor with the pump wheel are difficult to access and therefore difficult to clean.

SUMMARY OF THE INVENTION

Accordingly, it is an object of the present invention to provide an inner filter for an aquarium of the above mentioned type, which avoids the disadvantages of the prior art.

More particularly, it is an object of the present invention to provide an inner filter for an aquarium which is designed so that it can be dismounted fast and simple by a user without special knowledge and auxiliary tools, a filter insert located in the filter chamber can be exchanged fast and without difficulties, and the remaining functional parts of the inner filter are well accessible for cleaning, maintenance and repairs.

In keeping with these objects and with others which will become apparent hereinafter, one feature of the present invention resides, briefly stated, in an inner filter for an aquarium which has three releasable and assembleable segments, with a first segment which contains the stator with the electrical conductor, a second segment which contains substantially the rotor with the bearing axle and bearings as well as the pump wheel, the pump chamber and the filter chamber and the suction passage as well as the pressure passage, and a third segment which is formed as a cover located on the second segment and closing the second segment and which has at least one outlet opening connectable with the pressure passage, wherein a suction passage connectable with the filter chamber is provided in the region of the third segment or the first segment.

When the inner filter is designed in accordance with the present invention it avoids the disadvantage of the prior art and provides for the above mentioned advantages.

Due to the subdivision of the inner filter into the three releasable and assembleable segments, with the first segment substantially containing the stator with the electrical conductor, it is possible for example for exchanging the filter insert or for cleaning and maintenance works to release the third and the second segments, while the first segment can remain as before inside the aquarium container at a predetermined position. The released second and third segments can be removed from the tank and cleaned when needed. When it is only necessary to exchange the filter insert, only the third segment must be withdrawn, so that the upper end of the second segment is released for withdrawing of the filter insert. The filter insert can be removed fast and without difficulties upwardly, and there is no danger that some dirt particles which adhere to the filter insert can remain in the aquarium tank. When also a cleaning of for example the third segment or also the second segment must be performed, both segments must be withdrawn from the tank while the first segment remains in the aquarium tank, they are cleaned and again inserted into the tank. This can be performed by a user without special expert knowledge and special tools fast and without difficulties.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a vertical section of the inner filter of FIGS. 1 and 2;

FIG. 4 is a view of a cap of the inner filter as seen in direction of the arrow IV in FIG. 3;

FIG. 5 is a view of the inner filter as seen in direction of the arrow V in FIG. 3, with a removed upper third segment;

DESCRIPTION OF THE PREFERRED EMBODIMENTS

Figure 1:
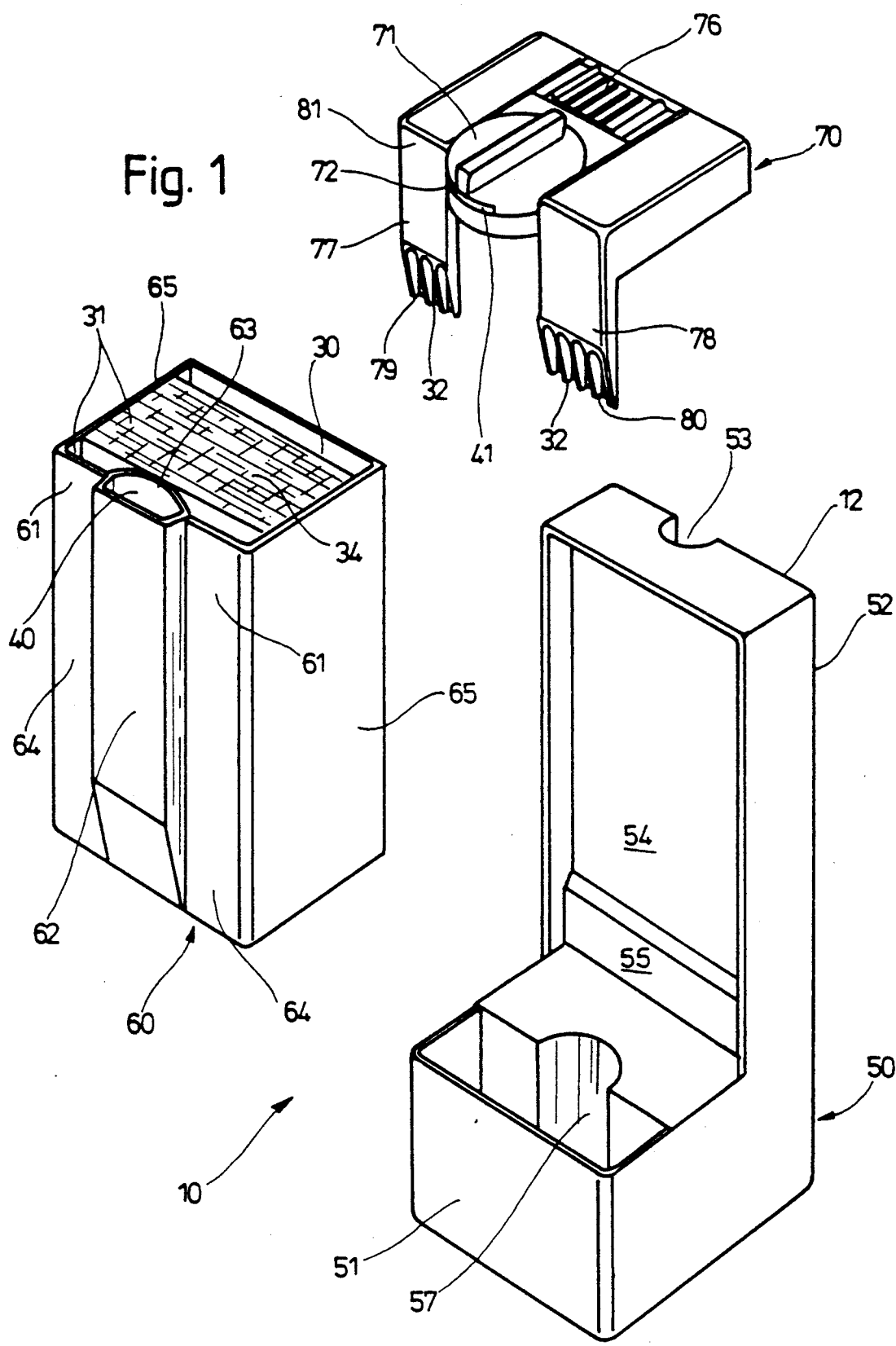
FIG. 1 is a perspective explosion view for an inner filter for an aquarium with three schematically shown separable segments.

An inner filter in accordance with the present invention is identified as a whole with reference numeral 10. It can be formed for example as a miniature filter which is suitable for example for an aquarium of up to 60 liter. The inner filter 10 is inserted in an aquarium tank 11 as shown in FIG. 3. It is releasably mounted with its rear side 12 on the associated inner side 13 of an aquarium wall 14 by means of suitable holders 15, for example suction members. The water level in the aquarium tank 11 is identified with reference numeral 16 in FIG. 3. It can be seen that the inner filter 10 is correspondingly deep in order to exchange water which is located in the aquarium tank 11.

The inner filter 10 has an electric motor 17. The electric motor as well known has a stator 11 and a rotor 19 and is supplied with current through an electrical conductor 20 extending upwardly from the aquarium tank. The electric motor 17 can be of a conventional type, for example a self-starting synchronous motor with a permanently magnetic rotor 19 which for example has two or several poles and is radially polarized. The magnetic poles with alternating polarity can be uniformly distributed around the rotor periphery. The rotor 18 is located in a passage 21 of the stator 18 so as to form the required air gap. The rotor 19 is held on a one-piece or two-pieces bearing axle 22 and rotatable so as to run substantially vertically. It is supported with its both ends in associated bearings 23 and 24 which can composed for example of elastic elements, for example, rubber lips. The rotor 19 drives a pump wheel 25 of a pump, which is located above the rotor 19 and in a pump chamber 26 and formed for example as multi-vane element.

The inner filter 10 has further a suction passage which is identified as a whole with reference numeral 30. It communicates with the pump chamber 26 at one side and with a filter chamber 31 which is located in the inner filter 10 upstream of the suction passage. When the pump wheel 25 rotates, water is aspirated from the aquarium tank 11 into the filter chamber 31 through at least one outwardly open aspiration opening 32 which is located under the water level 16, as identified with an arrow 33 in FIG. 2. At least one schematically shown filter insert 34 can be accommodated in the filter chamber 31 and composed of a filtering material, for example of foam material or other suitable filtering material, activated coal, etc.

The filter insert 34 is shown schematically as a suspended, upwardly withdrawable four-cornered block. The aspirated water passes in correspondence with the arrows in FIGS. 2 and 3 through the filter insert 34 through its total vertical dimension or at least through a substantial part of the vertical dimension transversely. Then the water after passing the filter insert 34, the suction passage 30 and the pump chamber 25 flows into a pressure passage 40. The pressure passage communicates with the pump chamber 26 on the one hand and with at least one outlet opening on the other end, so that the water exits through the outlet opening in correspondence with the arrows in FIGS. 2 and 3 from the inner filter 1 and then again supplied back into the aquarium tank 11. The inner filter 10 is located in the water of the aquarium tank so deep that advantageously at least one outlet opening 41 is located above the water level 16.

A further special feature of the inner filter 10 is that it is composed of three releasable and again assembleable, for example pluggable-in segments 50, 60 and 70. The segments are designed so that when needed they can be separated from one another by a user as shown for example on the explosive view of FIG. 1. As a rule, the first segment 50 remains inside the aquarium tank 11 and is therefore releasably mounted on the aquarium wall 14, while only the second segment 60 and the third segment 70 can be withdrawn upwardly from the first segment 50, as will be explained hereinbelow.

The first segment 50 is substantially L-shaped. Its shortest L-leg 51 extends forwardly and can be placed on the second segment 60 in a vertical direction from above. The first segment 50 contains substantially the stator 18 of the electric motor 17 with the electrical conductor 20 and forms a part which can be mounted with its rear side 12 releasably on the aquarium wall 14. For example for cleaning the inner filter 10 it can remain in the fixedly mounted position in the tank as shown in FIG. 3.

The second segment 60 is designed so that it contains substantially the rotor 19 with the bearing axle 22 and the bearings 23 and 24, as well as the pump wheel 25, and also the pump chamber 26 or at least its greater part as well as the filter chamber 31, the pressure passage 40, and the suction passage 30. At least a substantial part of the suction passage 30 is a component of the second segment 60.

The third segment 70 is formed as a substantially cap-shaped cover. It can be placed on the second segment 60 from above so as to close the second segment. The third segment 70 has at least one outlet opening 32 which is connectable with a filter chamber 31, and also at least one outlet opening 41 which is connectable with the pressure passage 40.

Figure 2:
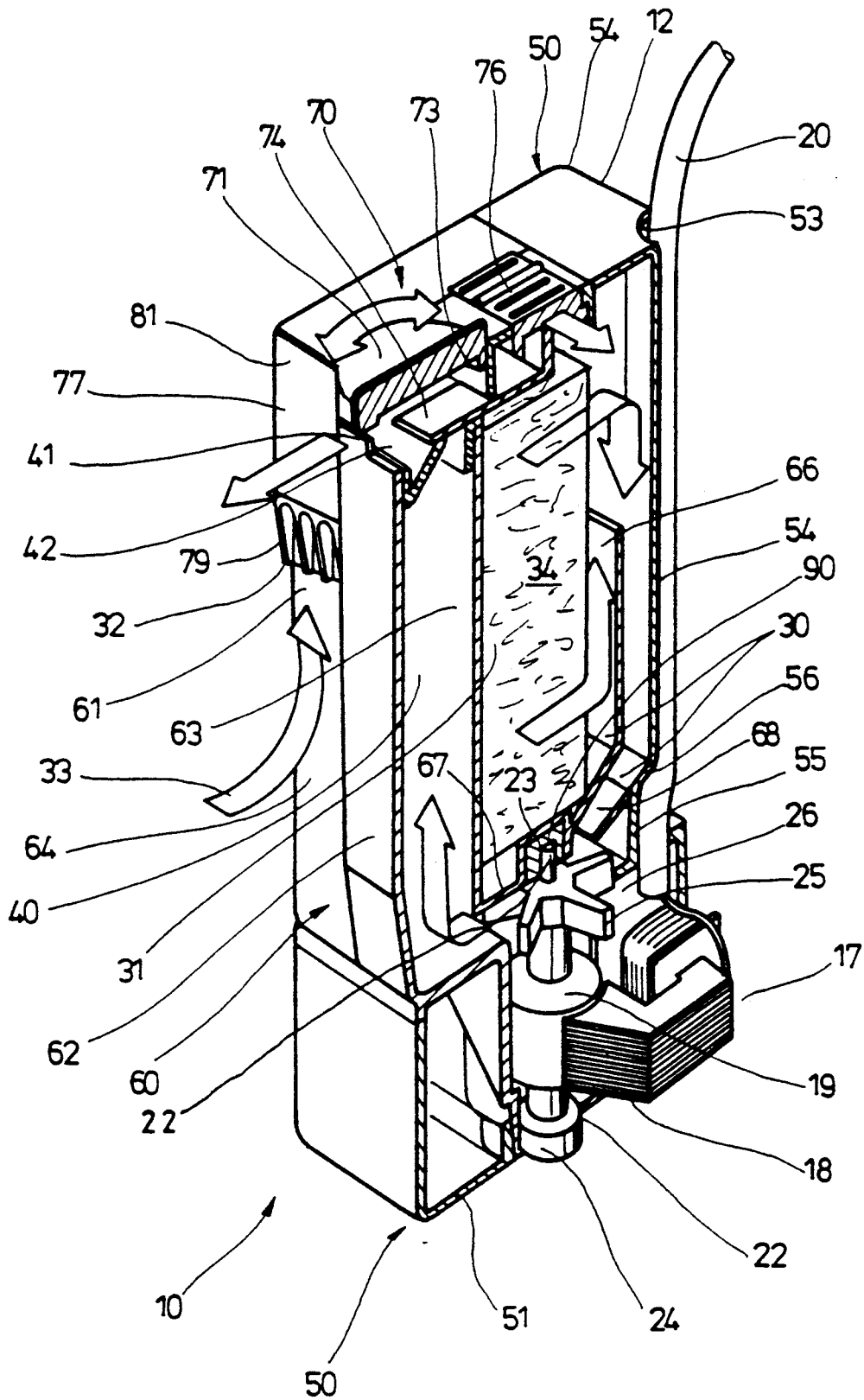
FIG. 2 is a schematic perspective view with a vertical section of the inner filter of FIG. in operative condition.
Figure 6:
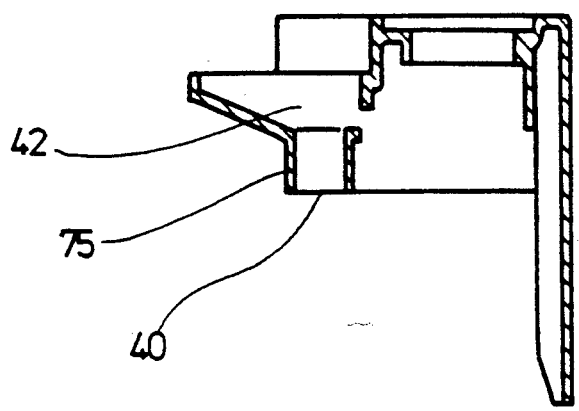
FIG. 6 is a view schematically showing a partially sectioned third segment of the inner filter, without the inserted cap and without the inserted slider for the volume control.
Figure 7:
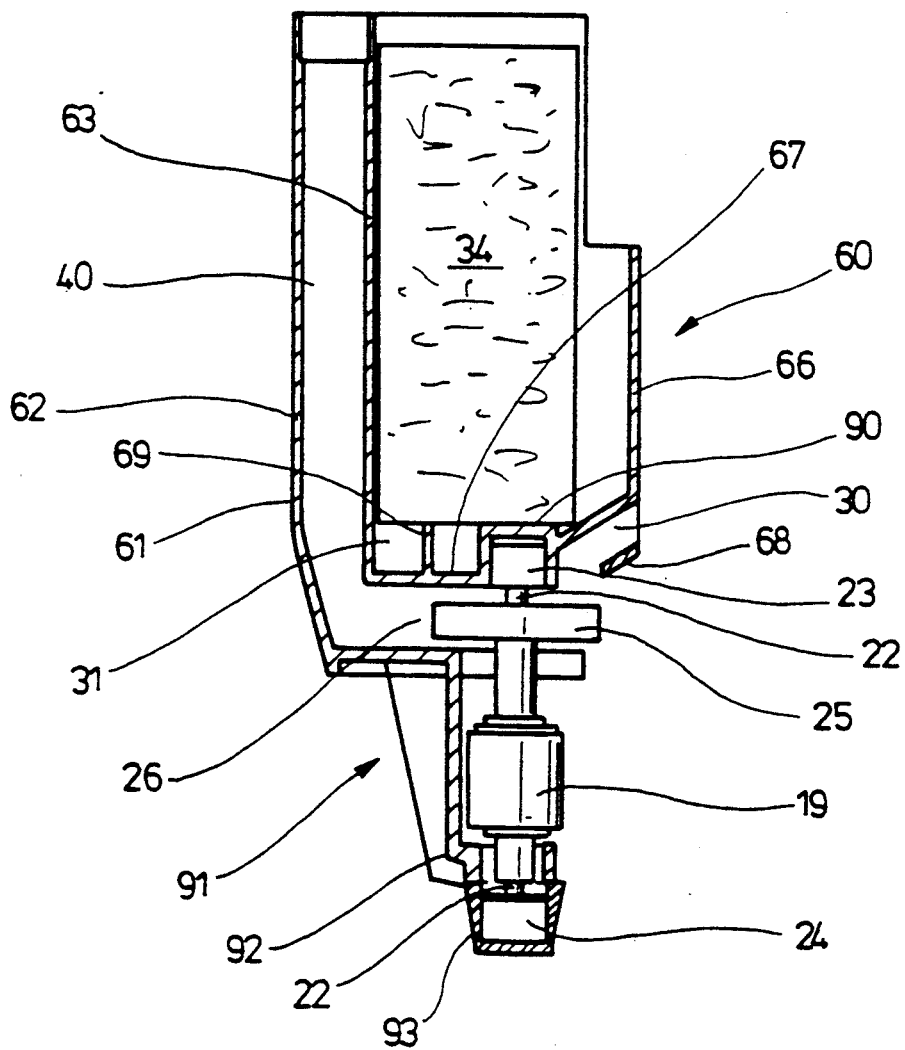
FIG. 7 is a partially sectioned side view of the removed second segment of the inner filter.

The so assembled inner filter 10 in the assembled condition of the three segments 50, 60 and 70 is a longitudinally extending substantially four-cornered body, especially rectangular or square body as shown in FIG. 2. During the use this body is oriented substantially vertically and held in the aquarium tank 11. The third segment 70 especially in form of the substantially cap-shaped cover, is placed on the upper side of the second segment 60 and not against the first segment 50 Therefore in the placed position the second segment 60 extends at the upper side up to the height of the substantially vertical, longer L-leg 52 of the first segment 50. In accordance with a not shown example, the inner filter can be formed as a longitudinally extending and substantially round and/or cornered for example triangular body.

The third segment 70 has for example a round cap 71 which closes the pressure passage 40 substantially in the region of its upper end 42 and has at least one opening 72. As can be seen from FIG. 4 the opening 72 is formed as a substantially reverse U-shaped slot and forms the above described outlet opening through which the water exits from the pressure passage 40 and is supplied back into the aquarium tank 11. The cap 71 has for example a substantially cylindrical wall 73 and is inserted with this wall into the third segment 70. It is turnably adjustable in it, for example, over a turning angle of maximum 70°. Thereby the cap 71 forms an upper turning discharge, so that the user by rotating the cap 17 can provide the discharge direction.

Moreover, the third segment 70 is provided with a device for controlling the volume flow. For this purpose the third segment 70 has for example a slider which controls the throughflow cross-section in the pressure passage 40, in particular the transition region of the pressure passage 40 to the outlet opening 41. The slider 74 controls the volume stream. It engages transversely in a tubular part 75 of the third segment 70 and controls its throughflow cross-section.

An adjusting handle 76 which operates in the same slider direction and can be grasped from outside engages the slider 74. It is held in the third segment 70 so that it is transversely displaceable. The third segment 70 is formed as a one-piece synthetic plastic member, in which the cap 71 and the transversely displaceable slider 74 with the adjusting handle 76 can be exchangeably inserted. The third segment 70 is connectable with the upper end of the second segment 60 for example by a plug connection. The tubular part 76 extends in the upper end 42 of the pressure passage 40 to produce at least a substantially tight connection.

The third segment 70 can have at least one projection. In the shown embodiment of FIG. 1 it has two projections 77 and 78 each provided with openings 79 and 80 which form the suction openings 72. The openings 79 and 80 can be formed for example as substantially vertically extending slots. Each projection 77, 78 passes from the opening 79, 80 in the suction passage 30, especially first in the filter chamber 31. Both projections 77, 78 are located on the front side 81 which is oriented to the left in FIGS. 1 and 2 and project from it. The projections 77, 78 extend at a distance from one another and substantially parallel to one another and formed identically. Each projection 77, 78 engages the second segment 60 on its associated upper end around the corresponding front side 61.

The opening 72 which first the outlet opening 41 in the cap 71, especially in its wall 73, of the third segment 70 is provided on the same front wall 81 on which the opening 79 and 80 which form the suction opening 32 are provided by means of the both-side projections 77, 78. However, the opening 72 is located above, so that there is a clear vertical separation between the outlet opening 41 and the suction openings 32 on the other hand.

Details of the first segment 50 are explained hereinbelow. This segment is formed preferably as a one-piece synthetic plastic member in which the stator 18 with the electrical conductor 20 is inserted. The reverse side 12 of the longer, substantially vertical leg 52 forms the mounting side. The holder 15, for example the suction member is provided on this side for releasable mounting on the inner side 13 of the aquarium wall 14. A substantially trough-shaped receptacle 53 is provided in the rear side 12, and the electrical conductor 20 is upwardly guided in the receptacle 53 The stator 18 of the electric motor 17 is located in the lower part of the first segment 50, especially in the substantially horizontal, shorter leg 51 and/or transition region between the legs 51, 52 wherein a corresponding space is available. The stator 18 is mounted in the first segment 50 with a water tight closure. The passage 21 which receives the rotor 19 is substantially vertically oriented in the stator 18.

The first segment 50 has a substantially vertically extending front wall 54 which extends at a distance from the rear side 12 and forms a rear wall limitation of the suction passage 30. By withdrawing of the second segment 60 from the first segment 50 which remains on the aquarium wall 14 the suction passage 30 is released. In the lower region 54 which guides the substantially horizontal short leg of the first segment 50, the front wall 54 forms a part of the wall limiting of the pump chamber 26 in which the inclined wall 56 is extended.

The second segment 60 is formed also as one-piece synthetic plastic member. The rotor 19 together with the bearing axle 22 and the bearings 23, 24, as well as the pump wheel 25 and in some cases at least one filter insert 34 are exchangeably inserted in the synthetic plastic member.

The second segment 60 is shorter by the height of the third segment 70 and by the height of the substantially horizontal short leg 51 of the first segment 50, and also is smaller by the depth of the substantially vertical leg 52 then the first segment 50. The dimension of the second segment 60 is selected so that the second segment is placed on the forwardly projecting part of the substantially horizontal shorter leg 51 of the first segment 50, and together with the first segment 50 forms a body having a substantially four-cornered cross-section, in particular a substantially rectangular or square cross-section as shown in FIG. 2.

The second segment 60 has a substantially L-shaped inner passage which is closed by the walls 62 an 63 leading to the pump chamber 26. The inner passage forms the pressure passage 40 and extends over the substantially vertical, longer leg at the front side and also at the substantially horizontal shorter leg to the rear side so as to form the pump chamber 26, and extends under the bottom region. Therefore the filter chamber 31 in the interior of the second segment 60 adjoins the inner wall 63 and is limited by the inner side of the wall 63, the remaining region of the adjoining front wall 64, and two substantially parallel side walls 63 The second segment has an upwardly extending wall part 66 which is provided on its rear side and faces the front wall 54 of the first segment 50. The wall part 66 extends substantially over the half height of the second segment 60 and limits the filter chamber 31. The wall part 66 limits moreover with its rear side a corresponding portion of the suction passage 30. The suction passage in the operative condition of the inner filter 10 is limited by the front wall 54 of the first segment 50.

The second segment 60 further has a bottom part 67 which is connected as one-piece with the wall 63 and the rear side wall part 66 and extends in a transverse direction from one side wall 65 to another side wall 65. The upwardly facing side of the bottom part 67 forms the bottom of the filter chamber 31, while the downwardly facing side forms an upper limit of the pump chamber 62. The vertically extending wall part 66 merges arcuately or as shown here inclinedly into the bottom part 67 The inclined course of it substantially corresponds to the inclined course of the inclined wall 56 of the first segment 50 which extends at the rear side at a distance from it. In the extension of the inclined wall 56, extends short inclined wall piece 68, which goes from one side wall 65 to another side wall 65 and is also a one-piece part of the segment 60. The wall piece 68 extends the inclined course of the inclined wall 68 and completes the inclinedly outwardly oriented transition conduit portion which connects the suction passage 30 with the pump chamber 26.

The filter insert 34 inserted in the filter chamber 31 is held in the region of the bottom part 67 with its lower end at a distance above the bottom part 67. This has the advantage that the filtered out dirt particles or the like can accumulate in this lower region. The wall part 66 which is oriented upwardly at least substantially over the half height of the second segment 60 has the advantage that, together with the side walls 65 and the inner walls 63 as well as the regions of the front wall 64 extending at both sides, it forms a trough of a corresponding height. During withdrawal of the filter insert 34 upwardly water remains in the trough, it is contained in the second segment 60 and also in the filter insert 34 and can be loaded with the dirt particles. It is therefore guaranteed that during the exchange of the filter insert 30 the water which is located in the above described trough and in some cases is contaminated is caught there and does not flow into the aquarium tank 11.

Vertically extending projections 69 serve for vertical spacing of the filter insert 34. They can be formed for example as webs on which the filter insert 34 is held in the filter chamber 31.

The bottom part 67 of the second segment 60 has a reversely U-shaped part 19 which is oriented upwardly toward the filter chamber 31. The upper bearing 33 formed for example as a rubber lip for the upper end of the bearing axle 22 of the rotor 19 is received in the portion 90. The portion 90 with its wall facing the filter chamber 31 forms a projection which corresponds to the projection 69. It can serve as a spacer at the lower side of the filter insert 34 which sits on it.

The pressure passage 40 is formed as an inner passage in the second segment 60, separated from the filter chamber 31. The inner passage is limited from outside on the one hand by the front wall 82 which is designed as a forwardly projecting somewhat gallery-like wall strip. It extends substantially in the central region of the front side 61 of the second segment 60 from above downwardly and between both front walls 64. Inwardly, the inner passage is limited by the inner wall 63. The inner wall 63 is curved inwardly to the filter chamber 61 and extends substantially over the width of the outer wall 62. It projects with its side edges from inside to the wall 62 so as to form a closed passage. Both walls 62 and 63 limit an inner tubular passage which is closed relative to the filter chamber 31 up to the pump chamber 26.

The second segment 60 moreover has a downwardly projecting holding device 91 in the region under the pump chamber 26. The rotor 19 together with the bearing axle 22 and the bearings 23 and 24 is held on the holding device 91. During placing of the second segment 60 on the substantially horizontal shorter leg 51 of the first segment 50, the holding device 91 extends in the interior 57 of the leg 51 of the first segment 50, so that the rotor 19 is received in it and therefore extends in the passage 21 of the stator 18. The holding device 91 has a downwardly projecting supporting part 92 and a lower bearing cap 93. The lower bearing 24, for example a rubber lip for the lower end of the bearing axle 22 of the rotor 19 is received in the bearing cap 93. The rotor 19 with the bearing axle 22 and both bearings 23 and 24 is held in this manner in the segment 60, while the pump wheel 25 is held in the upper end of the rotor 19 which extends into the pump chamber 26.

When the inner filter 10 is assembled for operation as shown in FIGS. 2 and 3, and inserted in the above described manner in the aquarium tank 11 and mounted on the aquarium wall 14 the inner filter 10 is turned on and the pump wheel 25 is driven by the rotor 19 in a rotary direction. Thereby the water is aspirated from the interior of the aquarium tank 11 through the suction openings 32 in form of the openings 79, 80 and in particular the slots on the projections 77, 78 into the filter chambers 31, and through the filter insert 34 located in the filter chamber transversely to it. The water flows through the suction passage 30 and the pump chamber 26 in the closed inner pressure passage 40 and through it is raised, discharged at the upper end of the inner filter 10 through the outlet opening 41 especially the slot shaped opening 72 in the cap 71 in correspondence with the arrow in FIG. 2, and then is again supplied into the aquarium tank 11. Due to this circulation of the water, it is cleaned in the inner filter 10 by filtration. When needed, an electric heating device for heating can be integrated.

The electric part of the electric motor 17 and the electric conductor 20 are sealed so that a contact with water is reliably prevented.

From time to time individual components of the inner filter must be cleaned. This can be practiced by a user fast, simple without special knowledge and special tools in the following manner. With the switched-off electric motor 7, the user first pulls the third segment 70 formed as the upper cover for example upwardly from the second segment 30, so as to release the upper end of the second segment 60.

The thusly separated third segment 70 can be cleaned by the user without difficulties. If desired, also the cap 71 and/or the slider 74 with the adjusting handle 76 can be released when cleaning is desired in these regions as well. Also, it is performed for the purpose of exchanges in the event of damages and the like.

When only the filter insert 34 is to be exchanged and for example cleaned, the user reaches from above in the filter chamber 31 and pulls out the filter insert 34. Some dripping water as well as water still located in the filter chamber 31 which can be loaded with dirt particles is collected in the above described manner inside the trough in the filter chamber 31 and hinders flowing out or draining in the aquarium tank 11. The removed filter insert 34 can be cleaned or exchanged with another insert. After this in a reverse manner the third segment 70 is placed again, so that the inner filter 10 is again operational.

When it is necessary to clean the interior of the second segment 60, for example also the pump wheel 25 and the region adjoining it, the second segment 60 is released from the first segment 50 which remains in the aquarium tank 11 and removed from the aquarium tank. Also, some water loaded with dirt particles located inside the filter chamber does not drain in the aquarium tank 11 and contaminates it. During withdrawal of the second segment 60 simultaneously the rotor 19 with the bearing axle 22 and the bearings 23 and 24 is separated from the first segment 50 and pulled out upwardly so that all components of the rotor including the pump wheel 25 become freely accessible. Also, the interior of the pump chamber 26 is then available from outside since the lower region 55 which limits the pump chamber 26 at the right end in FIG. 3 is a component of the first segment 50 an remains in the aquarium tank 11 during the separation. Also the wall part 66 of the suction passage 30 is freely accessible, since the other front wall 54 which limits the suction passage remains as a part of the first segment 50 in the aquarium tank 11.

With the removed second segment 60 the whole rotor 19 with the bearing axle 22 and the bearings 23 and 24 and with the pump wheel 25 can be cleaned, maintained and if necessary replaced. Also, the interior of the filter chamber 31 can be cleaned without problems with the removed filter insert 34. When the inner filter 10 is again assembled to form an operational body, it is performed in a reverse manner and can be done fast and without difficulties.

In accordance with another, not shown, embodiment the suction openings 32 are provided not in the segment 70, but instead they are formed on the suction regions of the front side of the front wall of the first segment 60, for example by webs and channels between them. They can be engaged from above by the second segment 60, whereby a connection with the filter chamber 31 and the suction passage 30 is provided.

It will be understood that each of the elements described above, or two or more together, may also find a useful application in other types of constructions differing from the types described above.

While the invention has been illustrated and described as embodied in an inner filter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An inner filter for an aquarium, comprising means forming a pump chamber, a filter chamber, at least one suction opening, and outlet opening, a suction passage which communicates with said pump chamber and said filter chamber and in which water is aspirated through said suction opening, a pressure passage which communicates with said pump chamber and said outlet opening; a pump wheel; an electric motor having a rotor which drives said pump wheel in said pump chamber and also having a stator; and a housing having three releasable and again assembleable segments, said segments including a first segment which contains substantially said stator with an electric conductor, a second segment which contains substantially said rotor with a bearing axle and bearings, as well as said pump wheel, said pump chamber, said filter chamber, said suction passage and said pressure passage, and a third segment which is placeable on said second segment and formed as a cover and has said outlet opening connectable with said pressure passage, said suction opening which is connectable with said filter chamber and being provided in the region of one of said third segment and said first segment.

2. An inner filter as defined in claim 1, wherein said third segment is formed as a cap which closes said pressure passage and has at least one opening which forms said outlet opening, said cap having a part which is provided with said opening and is turnable.

3. An inner filter as defined in claim 2, wherein said part which is provided with said opening is a wall of said cap.

4. An inner filter as defined in claim 2, wherein said third segment has at least one projection provided with an opening which is formed as said suction opening, said opening which forms said outlet opening and said cap of said third segment and said opening which forms said suction opening of said third segment being located on a same side of said third segment and said outlet opening being located above said suction opening.

5. An inner filter as defined in claim 4, wherein said third segment has a front side, said outlet opening and said suction opening being located at said front side of said third segment.

6. An inner filter as defined in claim 1, wherein said third segment has a slider which controls the flow cross-section of said pressure passage and therefore controls a volume stream.

7. An inner filter as defined in claim 5, wherein said slider is arranged in a transition region between said pressure passage and said outlet opening.

8. An inner filter as defined in claim 1, wherein said third segment has at least one projection provided with an opening which forms said suction opening and passing from said opening in said suction passage.

9. An inner filter as defined in claim 8, wherein said opening in said third segment is formed as a slot.

10. An inner filter as defined in claim 8, wherein said at least one projection extends first in said filter chamber and then in said suction passage.

11. An inner filter as defined in claim 1, wherein said third segment has a side provided with two identical projections which extend at a distance from and parallel to one another.

12. An inner filter as defined in claim 11, wherein said side is a front side of said third segment, said projections being provided on said front side of said third segment.

13. An inner filter as defined in claim 11, wherein at least one of said projections of said third segment engages over said second segment on an associated upper end of one side.

14. An inner filter as defined in claim 13, wherein said second segment has a front side which forms said one side, said at least one projection of said third segment engages over said front side of said second segment.

15. An inner filter as defined in claim 1, wherein said housing including said three segments in an assembled conditions forms a longitudinally extending body.

16. An inner filter as defined in claim 15, wherein said body has a round shape.

17. An inner filter as defined in claim 15, wherein said body has a cornered shape.

18. An inner filter as defined in claim 17, wherein said body has a multi-cornered shape.

19. An inner filter as defined in claim 18, wherein said body has a rectangular shape.

20. An inner filter as defined in claim 18, wherein said body has a square shape.

21. An inner filter as defined in claim 1, wherein said first segment on a side view is L-shaped and has a substantially vertical, longer leg with a rear side forming a mounting side for mounting in an aquarium.

22. An inner filter as defined in claim 21, and further comprising holding means provided on said rear side of said first segment for releasably mounting said first segment on an aquarium wall.

23. An inner filter as defined in claim 22, wherein said hanging means includes a suction member.

24. An inner filter as defined in claim 1, wherein said first segment has a rear side provided with a trough-shaped receptacle for receiving said electrical conductor.

25. An inner filter as defined in claim 1, wherein said segment has a lower part which contains said stator of said electric motor and also has a vertically oriented receptacle for receiving said rotor, said lower part of said first segment also having suction regions communicating with one of said filter chamber and said suction passage.

26. An inner filter as defined in claim 25, wherein said suction regions are formed by a plurality of webs which form passages therebetween.

27. An inner filter as defined in claim 25, wherein said first segment has on a side view an L-shaped cross-section provided with a substantially vertical longer leg and a substantially horizontal shorter leg, said stator being received in said substantially horizontal shorter leg.

28. An inner filter as defined in claim 25, wherein said first segment has on a side view an L-shaped cross-section provided with a substantially vertical longer leg and a substantially horizontal shorter leg, said stator being received in a transition region between said legs.

29. An inner filter as defined in claim 1, wherein said first segment has a rear side and a substantially vertical front wall which extends at a distance from said rear side and forms a wall which limits said suction passage which is releasable during withdrawal of said second segment.

30. An inner filter as defined in claim 29, wherein said first segment on a side view has an L-shaped cross-section and is provided with substantially horizontal, shorter leg, said front wall of said first segment in its lower region which leads to said horizontal, shorter leg forms a part of a wall limiting said pump chamber.

31. An inner filter as defined in claim 1, wherein said first segment on a side view is substantially L-shaped and has a substantially vertical, longer leg and a substantially horizontal shorter leg, said second segment being shorter by a height of said third segment and said substantially horizontal, shorter leg of said first segment and also being smaller by a depth of said substantially vertical, longer leg than said first segment, said second segment being dimensioned so that it is placed on a projecting part of said substantially horizontal, shorter leg of said first segment and completes said first segment to form a body having a substantially four-cornered cross-section.

32. An inner filter as defined in claim 31, wherein said body has a substantially rectangular cross-section.

33. An inner filter as defined in claim 31, wherein said body has a substantially square cross-section.

34. An inner filter as defined in claim 31, wherein said third segment formed as said cover is placed on an upper side of said second segment and extends said second segment to a height of said substantially vertical, longer leg of said first segment.

35. An inner filter as defined in claim 1, wherein said second segment has walls which lead up to said pump chamber and also has a substantially L-shaped inner passage which is closed by said walls and forms said pressure passage, said inner passage having a substantially vertical leg at a front side and a substantially horizontal leg below, said second segment also having in its interior a limiting region which forms said filter chamber.

36. An inner filter as defined in claim 1, wherein said second segment has a rear side which faces a front wall of said first segment and has a vertically extending wall portion which limits said filter chamber and also limits a portion of said suction passage.

37. An inner filter as defined in claim 36, wherein said second segment has a bottom part with an upper side forming a bottom of said filter chamber and a lower side limiting said pump chamber, said vertically extending wall part merges arcuately in said bottom part.

38. An inner filter as defined in claim 36, wherein said second segment has a bottom part with an upper side forming a bottom of said filter chamber and a lower side limiting said pump chamber, said vertically extending wall part merges inclinedly in said bottom part.

39. An inner filter as defined in claim 1, wherein said second segment has a bottom part with an upper side which limits a bottom of said filter chamber and a lower side which limits said pump chamber.

40. An inner filter as defined in claim 1, wherein said second segment has a front wall and an inner wall which extends over a width of said front wall and is connected with it, said pressure passage is formed by an inner passage which is formed by said front wall and said inner wall, said front wall and said inner wall forming said inner passage as a tubular passage which is closed with respect to said filter chamber up to said pump chamber.

41. An inner filter as defined in claim 1, wherein said front wall of said second segment is formed as at least a balcony-like substantially forwardly projecting wall strip.

42. An inner filter as defined in claim 1, wherein said second segment formed as said cover has a downwardly open tubular part which engages in an upper open end of said pressure passage of said second segment.

43. An inner filter as defined in claim 42, and further comprising a slider provided in said third segment and controlling a flow cross-section of said pressure passage, said slider engaging transversely in said tubular part and controlling its flow cross-section.

44. An inner filter as defined in claim 1, wherein said first segment has a receptacle for said stator and on a side view is L-shaped and has a substantially horizontal, shorter leg, said second segment having a downwardly projecting holding element which holds said rotor with said bearings, said holding element during placing of said second segment on said substantially horizontal, shorter leg of said first segment extending into an interior of said substantially horizontal, shorter leg so that said rotor extends in said receptacle of said stator.

45. An inner filter as defined in claim 44, wherein said rotor and said bearing axle on its lower end, said bearings having a lower bearing for said bearing axle of said lower end of said rotor, said holding element having a lower bearing cap which receives said lower bearing.

46. An inner filter as defined in claim 45, wherein said lower bearing is formed as a rubber lip.

47. An inner filter as defined in claim 45, wherein said rotor has an upper end provided with said bearing axle, said bearings having an upper bearing for said bearing axle of said upper end of said rotor, said second segment has a bottom part with an upwardly directed reverse portion facing said filter chamber and receiving said upper bearing.

48. An inner filter as defined in claim 47, wherein said upper bearing is formed as a rubber lip.

49. An inner filter as defined in claim 1, wherein said pump chamber is located above said rotor, and said rotor has an upper end projecting in said pump chamber, said pump wheel being arranged on said end of said rotor and located in said pump chamber.

50. An inner filter as defined in claim 1, wherein said second segment has outer side walls which limit said filter chamber.

51. An inner filter as defined in claim 1, wherein said second segment has a bottom part; and further comprising at least a filter insert which is located in said filter chamber and has a lower end spaced above said bottom part.

52. An inner filter as defined in claim 51, wherein said bottom part projections extending in said filter chamber and supporting said filter insert in said filter chamber.

53. An inner filter as defined in claim 52, wherein said projections are formed as webs.

54. An inner filter as defined in claim 52, wherein said second segment has a bottom part provided with an upwardly directed reverse portion which faces said filter chamber, said reversed portion having an upper wall which faces said filter chamber and has a projection supporting said filter insert in said filter chamber.

55. An inner filter as defined in claim 1, wherein said first segment is formed as a one-piece synthetic plastic member in which said stator of said electric motor with said conductor are exchangeably inserted.

56. An inner filter as defined in claim 1, wherein said second segment is formed as a one-piece synthetic plastic member in which said rotor with said bearing axle and said bearings as well as said pump wheel are exchangeably inserted.

57. An inner filter as defined in claim 56, and further comprising a filter insert arranged in said filter chamber, said filter insert being exchangeably inserted in said synthetic plastic member.

58. An inner filter as defined in claim 1, wherein said third segment is formed as a one-piece synthetic plastic member, said third segment having a turnable cap for closing said pressure passage and a transversely displaceable slider provided for controlling a flow cross-section of said pressure passage and having an adjusting handle, at least one of said cap, said slider and said adjusting handle being exchangeably inserted in said synthetic plastic member.

59. An inner filter as defined in claim 58, wherein said turnable cap, said transversely displaceable slider and said adjusting handle are exchangeably inserted in said synthetic plastic member.

* * * * *